W. M. RYERSON.
Harness Saddle-Tree.

No. 204,507. Patented June 4, 1878.

WITNESSES:
Francis McArdle
C. Sedgwick

INVENTOR:
W. M. Ryerson
BY
ATTORNEYS.

UNITED STATES PATENT OFFICE.

WILLIAM M. RYERSON, OF NEWTON, NEW JERSEY.

IMPROVEMENT IN HARNESS-SADDLE TREES.

Specification forming part of Letters Patent No. 204,507, dated June 4, 1878; application filed May 15, 1878.

*To all whom it may concern:*

Figure 1:
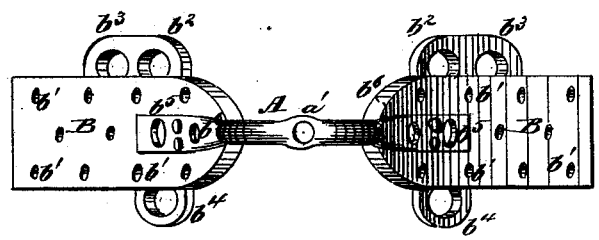
Figure 2:
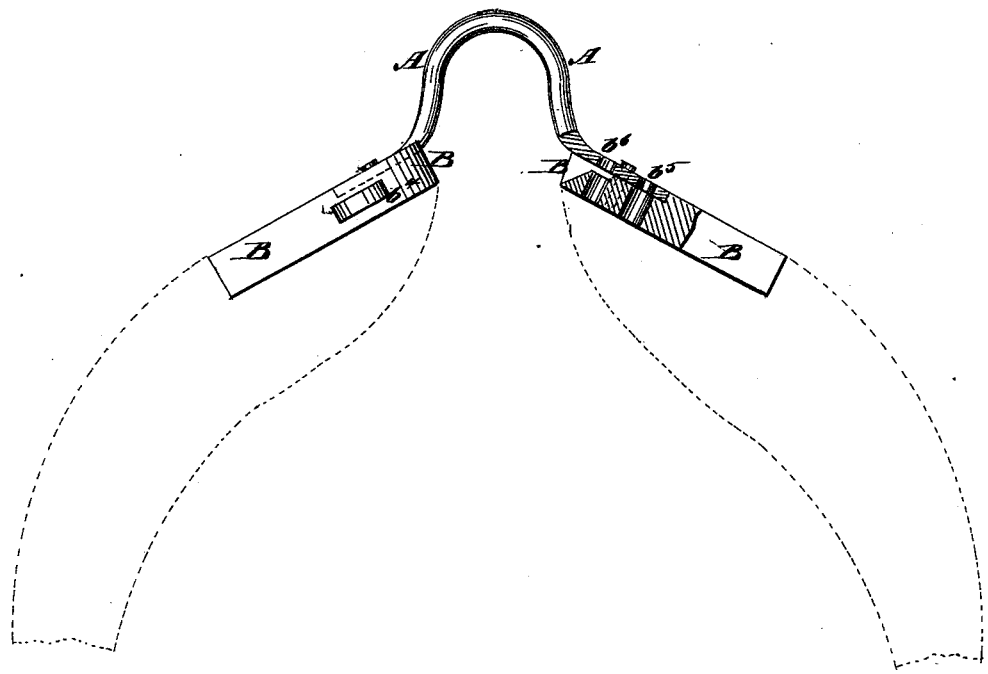

Be it known that I, WILLIAM MARTIN RYERSON, of Newton, in the county of Sussex and State of New Jersey, have invented a new and useful Improvement in Harness-Saddle Trees, of which the following is a specification:

Figure 1 is a top view of my improved saddle-tree. Fig. 2 is a rear view of the same, part being broken away to show the construction.

Similar letters of reference indicate corresponding parts.

The object of this invention is to furnish an improved saddle-tree for harness which shall be so constructed as to prevent the saddle from injuring the horse's back or coming in contact with his backbone, so that his back will not be made sore, and will be allowed to heal while he is in daily use, should it have been previously injured, and which at the same time shall be simple in construction, neat in appearance, also strong and durable.

The invention consists in the harness-saddle tree formed by the combination of the arch and the two plates provided with the holes, the lugs upon their forward edges to receive the check-reins and the collar-braces, the lugs upon their rear edges to receive the divided back-strap, and the screw-holes in their upper parts, substantially as hereinafter shown and described.

A represents an arched bar, to the end parts of which are attached, or upon them are formed, metal plates B. The arched bar A is made of such a length that the plates B and the padding of the saddle shall not come in contact with the horse's backbone.

Various holes $b^1$ are formed through the plates B for convenience in sewing the saddle-straps to the said plates.

Upon the forward edges of the upper parts of the plates B are formed lugs $b^2$ $b^3$, which may be formed in one piece, if desired. The upper lugs $b^2$ are designed to receive the parts of the divided check-reins, and the lower lugs $b^3$ are designed to receive the brace-straps of the collar.

Upon the rear edge of the upper parts of the plates B are formed lugs $b^4$, to receive the divided back-strap, so that the back-strap also may be kept from coming in contact with the backbone of the horse.

In the upper part of the plates B are formed holes $b^5$, to receive the rein-terrets, and above them are formed holes $b^6$ to receive check-hooks, so that the ordinary check-rein may be secured by them and the hook at the hole $a'$, or the divided check-rein may be secured to the lugs $b^2$, as may be desired.

In case the check-hooks are not used, their place may be supplied with screws to make the connection between the plates B and the straps of the saddle more secure.

In the upper part of the arched bar A is formed a hole, $a'$, in which may be secured a check-hook when desired. When the said check-hook is not desired for use, it may be replaced by an ornament, if desired.

A saddle-tree thus constructed enables an arched bar provided with bells to be readily secured to it by means of the terrets or screws, which bar and bells may be readily detached when not required for use.

Having thus described my invention, I claim as new and desire to secure by Letters Patent—

The harness-saddle tree formed by the combination of the arched bar A and the two plates B, provided with the holes $b^1$, the lugs $b^2$ and $b^3$ upon their forward edges to receive the check-reins and the collar-braces, the lugs $b^4$ upon their rear edges to receive the divided back-strap, and the screw-holes $b^5$ $b^6$ in their upper parts, substantially as herein shown and described.

WILLIAM MARTIN RYERSON.

Witnesses:
H. O. RYERSON,
J. H. B. HOWELL.